United States Patent [19]

Anstey

[11] Patent Number: 4,749,057
[45] Date of Patent: Jun. 7, 1988

[54] SEISMIC EXPLORATION WITH A SWINGING-WEIGHT VIBRATOR

[76] Inventor: Nigel A. Anstey, 19 Coolidge Rd., Winchester, Mass. 01890

[21] Appl. No.: 337,749

[22] Filed: Jan. 7, 1982

[51] Int. Cl.$^4$ .............................................. G01V 1/04
[52] U.S. Cl. ..................................... 181/121; 367/189
[58] Field of Search ............... 181/121, 113, 114, 401;
367/189, 75, 190, 41, 48; 73/662, 667; 404/117

[56] References Cited

U.S. PATENT DOCUMENTS 3,229,784  1/1966  Lyons et al. .................... 181/114
3,288,243 11/1966  Silverman ........................ 181/401

*Primary Examiner*—Nelson Moskowitz
*Assistant Examiner*—Gregory C. Issing
*Attorney, Agent, or Firm*—Daniel H. Kane, Jr.

[57] ABSTRACT

A swinging-weight seismic vibrator is driven by the energy stored in a flywheel. Since the sweep rate is large near the resonance of the vibrator-ground coupling, and small away from resonance, a measure of compensation of the resonance is automatically obtained. Weights of variable eccentricity may be provided. Multiple vibrators may be used, provided that no two vibrators generate the same frequency at times separated by less than the maximum reflection time of interest.

8 Claims, 9 Drawing Sheets

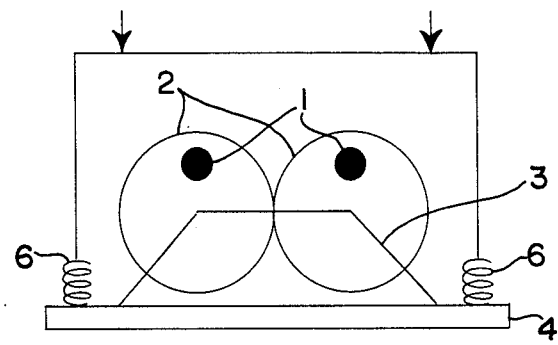
FIG IA (PRIOR ART)
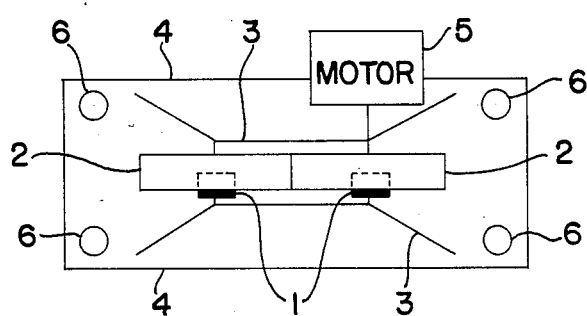
FIG IB (PRIOR ART)
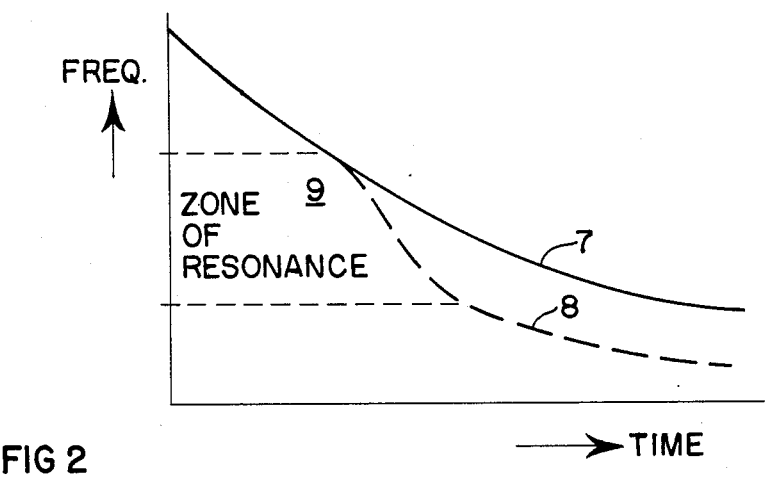
FIG 2

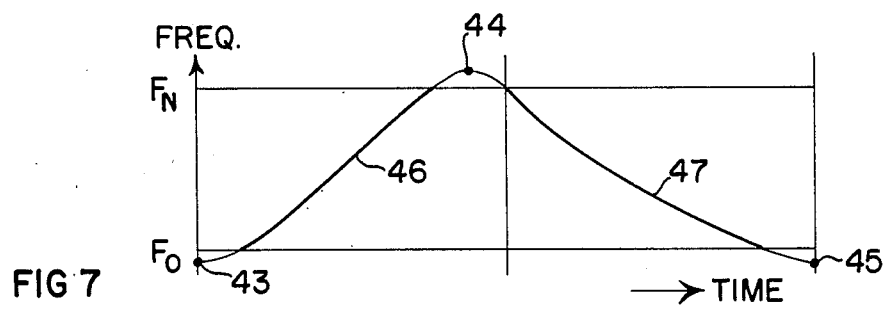
FIG 7
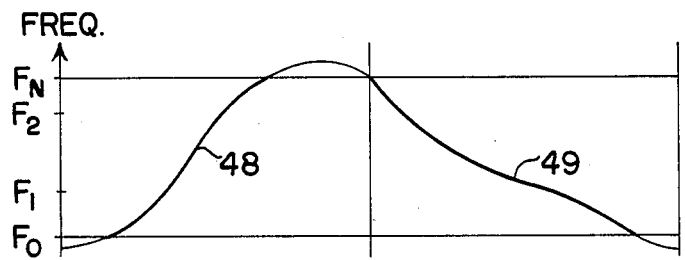
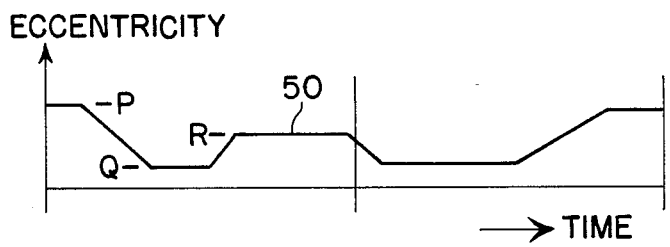
FIG 8

SEISMIC EXPLORATION WITH A SWINGING-WEIGHT VIBRATOR

CROSS REFERENCE TO RELATED APPLICATIONS

This patent application is based upon British patent application Ser. No. 8,101,575 entitled "Seismic Exploration with a Swinging Weight Vibrator" and British patent application Ser. No. 8,101,576 entitled "Seismic Exploration Using Compressional and Shear Waves Simultaneously". Applicant filed these British applications in the United Kingdom on Jan. 20, 1981 and herewith claims the convention priority date of these applications.

The present application is also related to U.S. patent application Ser. No. 337,750 filed 1/07/82 and entitled "Seismic Exploration Using Compressional and Shear Waves Simultaneously".

TECHNICAL FIELD

This invention is concerned with seismic exploration for petroleum by the Vibroseis method, using swinging-weight vibrators.

BACKGROUND ART

The Vibroseis method was initially implemented with a swinging-weight vibrator (Crawford, Doty and Lee; Geophysics v.25 p. 95, 1960). Very soon this was abandoned for hydraulic vibrators. Several hydraulic units could be used in unison and their characteristics were better suited to the recording and correlating technology of the day.

Since then the hydraulic vibrator has become very complex. It is fairly reliable, but very expensive. Further, its limitations of bandwidth have become onerous, as demands increase for better geological resolution. The limitation at the high-frequency end is because the vibrator is basically a constant-force device, because of the compressibility of the hydraulic oil, because of limitations in the servo-valve, and because of the heavy baseplate. These limitations can be offset by sweeping for longer times at the higher frequencies, but this proves to be very expensive. The limitation at the low-frequency end is because of stroke constraints, and because of serious even-order distortion. Again these limitations can be offset by sweeping for longer times at the low frequencies; this is less expensive than at the high frequencies. Particularly at the low frequencies, major phase shifts occur between desired and obtained signals; these must be eliminated by an expensive phase-compensation system.

In contradistinction, the swinging-weight vibrator is essentially simple and inexpensive. Since it is a constant-displacement device, its useful seismic output tends to rise with frequency. Its baseplate can be made light. Its output at low frequency contains little even-order distortion, and although this output is small it can be supplemented by simple changes to the swinging weight.

OBJECTS OF THE INVENTION

Accordingly it is an object of this invention to provide a novel Vibroseis vibrator which is inexpensive, simple and reliable.

Another object is to provide a vibrator whose useful output rises at high and/or low frequencies, in controlled manner.

It is a further object to provide a method by which any desired signal spectrum may be achieved with the vibrator, substantially independent of the vibrator-ground coupling.

DISCLOSURE OF THE INVENTION

These objects are achieved with a contra-rotating swinging-weight vibrator driven by energy stored in a flywheel. The phase of the vibrator, as a function of time, is used to define a master sweep whose amplitude is made a function of the sweep rate. The use of a free downsweep provides a measure of automatic compensation for resonance in the vibrator-ground coupling. Supplementary output at low and/or high frequencies is obtained by controlled variation of the eccentricity. A plurality of vibrators may be arranged to have complementary acceleration and deceleration periods, or to be optimized for different parts of the frequency range, or for simultaneous use at spaced-apart frequencies.

More particularly the vibrator comprises a base for coupling energy to the ground and a pair of contra-rotating rotors or secondary fly-wheels mounted for rotation on the base. Weights are disposed eccentrically on the wheels, rotors or secondary fly-wheels with specified eccentricity according to the amplitude of periodic forces or vibrations to be coupled through the baseplate to the ground. In the preferred form, the eccentricity of the weights may be varied during the sweep of frequencies, for example, from high to low frequency as a function of frequency according to the impedance characteristics of the earth. Thus, in regions of the downsweep frequency band width with good impedance matching, coupling and radiation of energy into the earth the eccentricity of the wheels and therefore the amplitude of energy delivered is decreased while at the high and low frequency extremes characterized by impedance mismatch,the eccentricity may be increased for imparting greater periodic force and amplitude of vibration.

The contra-rotating eccentric weights in the form of secondary rotors or fly-wheels are driven by the energy stored in a primary fly-wheel driven up to speed by a separate motor. During downsweep of the vibrator from high to low frequency within a specified range the primary fly-wheel is free-wheeling and decelerates as energy is imparted to the fly-wheels. In portions of the frequency spectrum characterized by good impedance matching with the earth and therefore high energy coupling and radiation of vibratory energy, the downsweep rate of the primary fly-wheel and the rotating weight vibrators increases. In the extremes of high and low frequency with poor impedance match and energy coupling with the earth the frequency sweep rate decreases for radiation and imparting of energy over a longer period of time. Thus, the coasting primary fly-wheel drive of the present invention affords at least partial compensation for the frequency dependent impedance coupling between the vibrator and the earth. Further compensation is afforded by varying the eccentricity of the fly-wheels as a function of frequency in order to achieve a more uniform frequency response, or frequency response of other desired characteristics.

Thus, the invention contemplates the method of providing one or more primary drive fly-wheels, driving the fly-wheels through a frequency upsweep to a desired maximum by means of an external drive motor and then using the stored energy of the primary fly-wheel while in free rotation to drive the vibrators during the downsweep within a specified sweep frequency range. The phase of the rotating eccentric weights is measured to generate a swept-frequency signal used for correlation with reflected vibrations.

Multiple or plural vibrators may be used with eccentric weights of different characteristics in order to cover different bands or portions of the desired frequency spectrum. The outputs of the plural vibrators may be so arranged and coordinated to act sequentially and provide effective and continuous overlapping coverage for wider frequency ranges.

Other features and advantages of the invention will be apparent in the following specification.

BRIEF DESCRIPTION OF DRAWINGS

The apparatus and method are now described with reference to the drawings, in which:

FIG. 1A is a diagrammatic side view of a swinging-weight vibrator of the prior art, while FIG. 1B is a diagrammatic plan view of the same swinging weight vibrator.

FIG. 2 is a graph illustrating the variation of sweep frequency with time, with and without resonance in the vibrator-ground coupling.

FIG. 7 is a graph showing a cycle of upsweep and downsweep when the vibrator is used on the upsweep.

FIG. 8 is a graph illustrating a variation of FIG. 7 in which the eccentricity of the weight is varied.

BEST MODE FOR CARRYING OUT THE INVENTION

Figure 3:
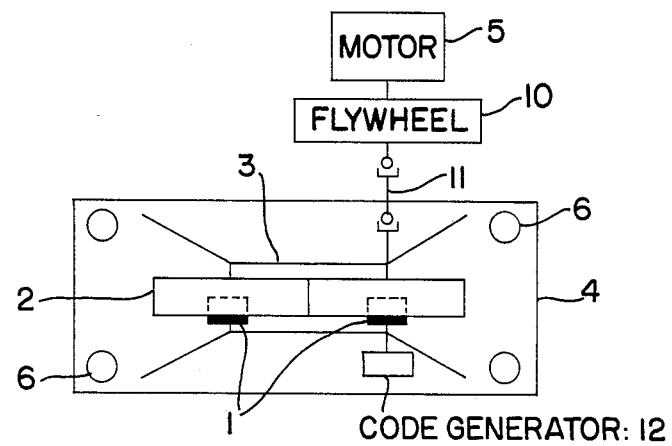
FIG. 3 is a diagrammatic plan view showing desirable changes to the vibrator of FIGS. 1A and 1B according to the invention.

FIGS. 1A and 1B show the basic swinging-weight vibrator known in the prior art. Equal weights 1 are caused to rotate eccentrically by equal gear wheels 2. The wheels are supported in a framework 3 on a baseplate 4, and driven by a motor 5. Isolated hold-down weight may be provided through springs 6. The weights rotate in opposite directions, and the points of attachment are such that the horizontal components of the centrifugal forces cancel while the vertical components reinforce. The frequency of the vibration is changed to achieve a sweep signal, by varying the speed of the drive motor. Drive motor 5 may be an electric motor, a hydraulic motor or an internal combustion engine. The resultant force varies with the mass of the weights, their eccentric radius, and the square of the frequency.

The coupling between the baseplate and the ground is likely to be a resonant system, and this reasonance is probably arranged to be in mid-band. While the motor is driving the vibrator through the resonant range of frequency, much power is drawn from the motor. At other frequencies the power is modest, and little energy is being transmitted into the earth. If the motor is of standard (non-synchronous) type, the sweep rate tends to be slow in the resonant range, and fast away from resonance. This is the opposite of the requirement for good signal bandwidth, which is that the sweep rate should be fast where the signal obtains good amplitude, and slow where less signal is usefully transmitted into the earth.

A first modification of the prior art according to the present invention is obtained, therefore, by providing one or more flywheels, by driving them up to a maximum desired frequency by means of the motor, and then by using the stored energy to drive the vibrator.

In this mode the vibrator emits only a weak signal away from resonance, but it emits it for a long time. Near resonance, energy is withdrawn very quickly from the vibrator, and the sweep rate is therefore fast. On the low side of resonance the vibrator returns to a slower sweep rate. Since with a well-constructed vibrator the efficiency is very large, the controlling factor on the frequency sweep rate is the rate of emission of seismic energy. There is therefore an automatic agency tending to counteract the undesirable effect of the resonance.

In FIG. 2, if curve 7 shown by the solid line represents the run-down of the vibrator in the absence of a coupling resonance, the dashed line curve 8 shows the effect of the resonance. To offset the higher output, the time spent in the zone of resonance 9 is automatically reduced. This system takes full advantage of the resonance in reducing the time spent transmitting the necessary energy, but also achieves a good bandwidth of the radiated signal.

One approach might be to make the gear wheels 2 very heavy, so that they become flywheels. The disadvantage of this is that it adds to the weight of the vibrator baseplate. Accordingly FIG. 3 shows a suitable compromise arrangement according to the invention in which the wheels 2 are given enough mass to have some flywheel action, but the major flywheel 10 is isolated from the vibrator by a drive shaft 11 fitted with universal joints. FIG. 3 corresponds with the prior art view of FIG. 1B, suitably modified and with corresponding elements designated by the same reference numerals. The flywheel 10 and the motor 5 can now be carried on the vehicle separate from the vibrators, as part of the hold-down weight. It may be desirable to split the flywheel 10 into two contra-rotating parts to avoid gyroscopic problems with the vehicle.

It must be stressed that the difference between FIG. 3 and FIG. 1B is not just the addition of a flywheel. In FIG. 1B the motor supplies the drive energy to work the vibrator, whereas in FIG. 3 it is important that most or all of the drive energy should come from the flywheel. Only in this manner is compensation obtained for the frequency dependence of the radiation impedance of the vibrator-ground coupling.

In the system of the present invention, no attempt is made to control the sweep in the manner used for hydraulic vibrators. The vibrator just runs down as its energy is radiated. The run-down (between given high and low frequencies) is fast if the coupling into the earth is good, and slow if the coupling is poor. It is correct, of course, that if the coupling is poor we must make a choice between increased time (that is, cost) and decreased bandwidth (that is, resolution).

Because the vibrator is not controlled, it is necessary to take a record of its vibration, for use in the correlation process. A suitable way to do this is to attach a pseudo-random code generator 12 to the flywheel 10, the drive shaft 11 or one of the wheels 2. This unit transmits to the recording instruments, over a radio link, one or more fade-resistant signals for each cycle of revolution. It is not necessary to transmit a continuous record of the vibrator phase. A reasonable compromise is to generate a unique code signal at each zero-crossing of the force vector, and perhaps at each peak and trough. A simple operation in the instruments can then erect a half-cycle or a quarter-cycle of a sinusoid between the spikes derived from demodulation of the codes, and so reconstitute the complete quasi-sinusoidal sweep. The code generator 12 can be of magnetic, optical or other type well known in the art. The radio link is conventional.

Because the sweep rate, and its variation with frequency, contain information on the output of the vibrator as a function of frequency, manipulations based on this information (including source-signature deconvolution) can be effected without requiring a transducer on the baseplate. For example, the amplitude of the sweep constructed as above can be modulated, as a function of frequency, before the sweep is used in correlation. Any desired spectrum for the correlated signal can be achieved in this way. Alternatively the information contained in the sweep rate can be used to derive a shaping operator to be applied in later processing. In effect, the sweep rate and its variation define, to a first approximation, the radiation impedance of the vibrator-ground system, the dependence of this impedance on frequency, the energy radiated at each frequency, the total energy radiated, and the additional time to extend the bandwidth at the low frequencies. All this is achieved very simply, merely by sending to the instruments the code or codes indicative of the phase of the vibrator. This is necessary, in any case, to obtain the sweep against which to correlate, but with this system much additional benefit is obtained also. These matters are further discussed hereinafter.

As noted above, the useful output of the vibrator ordinarily rises with frequency. The degree to which it does so contributes a desirable pre-compensation of the high frequencies, in anticipation of a loss of these frequencies in the earth. For some targets, this pre-compensation may be sufficient to keep the reflected signal spectrum substantially flat over a considerable range. For others, the pre-compensation may be inadequate. In any case, of course, the output from a swinging-weight vibrator tends to be deficient at the very low frequencies. Accordingly, there is merit in modifying the vibrator to provide progressively augmented output at the low frequencies (perhaps 5–25 Hz) and possibly at the highest frequencies (perhaps 50–100 Hz).

Figure 4:
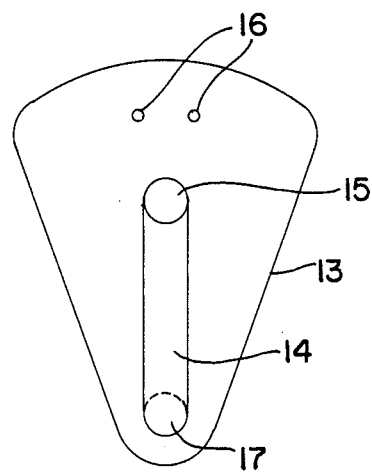
FIG. 4 is a plan view illustrating a variable eccentric weight.

FIG. 4 illustrates diagrammatically a means for doing this. The eccentric weight 13 is here formed in a wedge shape, into which a slot 14 is cut to take the axle of rotation. When the axle occupies position 15 the weight is balanced. Minor adjustments to perfect the balance can be made by additional masses 16. In this condition the machine generates no vibration, and the only input required to keep it running at constant speed is the minor amount necessary to overcome friction. As the axle is caused to occupy other positions in the slot, culminating in the position 17, it generates progressively stronger vibrations. This is both because the eccentric mass increases and because the radius of eccentricity increases.

Figure 5:
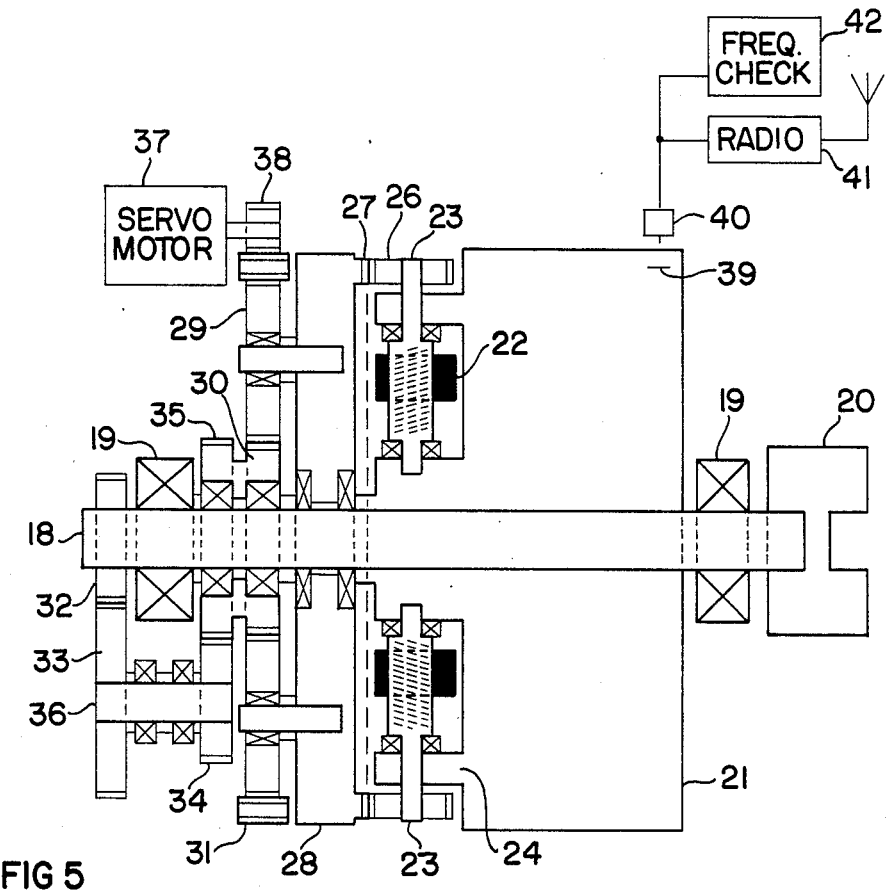
FIG. 5 is a side cross section illustrating a variable-eccentricity vibrator according to the invention.
Figure 6:
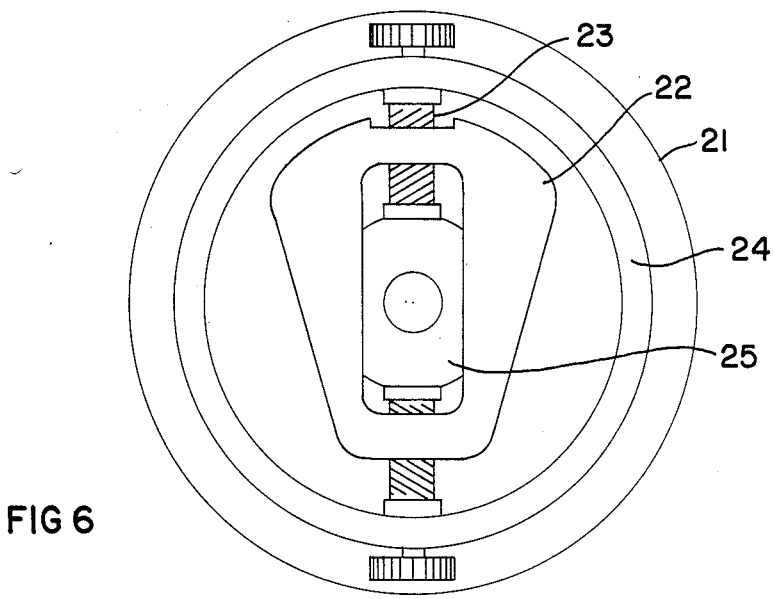
FIG. 6 shows a detail plan view of the eccentric weight.

FIG. 5 shows diagrammatically a vibrator in which the relative position of the axle and the slot may be changed while the vibrator is in operation. A strong shaft 18 is mounted in robust bearings 19 supported from the baseplate (not shown). The shaft is driven through coupling 20. The minor flywheel of FIG. 3 becomes flywheel 21. The eccentric weight 22, together with leadscrews 23 by which its eccentricity may be changed, is mounted within a space milled out in the flywheel 21. The flange 24 provides containment in the event the weight should break and fly wild. FIG. 6 shows a view looking into the space containing the weight and the leadscrews. The boss 25 of the flywheel has hardened flats on which the weight can slide, and by which the rotary motion is imparted to the weight. The threads contacting the leadscrews may be permitted some lateral movement.

The remainder of the apparatus shown in FIG. 5 represents one means by which the eccentricity of the weight may be changed, during operation, by rotation of the leadscrews. The leadscrews are fitted with gears 26 meshing with a ring gear 27 mounted on wheel 28. Relative motion between wheel 28 and flywheel 21 therefore moves the weight. The wheel 28 carries two planet wheels 29, rotating about a sun wheel 30 within a ringwheel 31. These three units constitute a differential. Gears 32, 33, 34 and 35, together with layshaft 36, provide gearing to offset any gear ratio inherent to the differential. By this means the wheel 28 rotates at the same speed as the flywheel 21 if the ring wheel 31 is maintained stationary. A servomotor 37 drives the ring wheel 31 through a gear 38. A portion of the ring wheel 31 has meshing teeth to engage this gear. The ring wheel 31 may be supported on peripheral bearings (not shown) or from an additional wheel (not shown) supported concentric to the shaft 18. Its position may be continuously detected by means of a potentiometer or displacement transducer (not shown), whose output represents one input to the servo loop driving the motor 37.

The phase of the vibrator may be obtained, for example, by the combination of a magnet 39 (attached to the flywheel 21) and one or more pick-up units 40. The pick-up may have several armatures and several coils disposed in such a way as to generate the unique pseudo-random codes described earlier. These are then transmitted to the recording instruments by radio 41. If a plurality of vibrators is used (as hereinafter described), the pick-ups 40 may differ between vibrators, so that only one radio channel is required. The output of the pick-up 40 is also used, at the vibrator, for a direct measurement of the frequency being radiated. The use of this, and the servo loop described above, will be discussed later.

FIG. 5 shows only one of the pair of vibrating units required according to FIG. 3. The second unit of the pair does not need its own differential and servo motor. Its flywheel may be driven from the identical flywheel 21 by means of peripheral gearing (not shown), and its wheel from the identical wheel 28 by means of similar peripheral gearing (not shown). This gearing must be engaged, of course, so that the leadscrews of both units are vertical at the same time. The term "vibrator" is now used to signify the pair of vibrating units assembled into the form of FIG. 3.

A first manner of use of this vibrator is illustrated in FIG. 7. The vibrator is swept up and down consecutively, driven up by the motor and coasting down by itself (or with reduced drive from the motor). This manner of operation loses part of the automatic compensation of the vibrator-ground coupling, as described previously. One cycle of the sequence is illustrated from low point 43 through high point 44 to low point 45. Because the Vibroseis signal demands a continuous change of frequency, the emission in the region of points 43, 44 and 45 should not be used. This is easily achieved by truncating the reconstituted sweep (against which the correlation is made) at frequencies $f_o$ and $f_N$, where the sweep rate is still suitable. The actual sweeps used are then as suggested in heavy lines. The upsweep 46 and the downsweep 47 are not identical. The downsweep provides the automatic compensation discussed earlier, but compensation of the upsweep requires a separate manipulation of the power drawn by the motor as a function of frequency, or inverse application of the sweep-rate information obtained from the downsweep, applied to the amplitude of the sweep used for correlation.

The only power wasted, in this manner of operation, is that supplied and released above frequency $f_N$, in the vicinity of point 44, and below frequency $f_o$. The system is very simple, and it may be used without the variable-eccentricity devices of FIG. 5. However, in this case it is not possible to move the vibrator, between positions, without allowing it to come to rest. One solution to this problem is to make the "baseplate" in cylindrical form, so that the unit can roll while vibrating.

The basic technique described above illustrates the design considerations involved in choosing the variables. The weight and its eccentricity are selected on considerations of practicality. The desired frequency range is dictated by the earth. The useful length of the sweep is dictated by the correlating equipment, and should preferably be many seconds (for example, 30 s). The moment of inertia of the major flywheel 10, supplemented by the minor flywheel 21, should be sufficient to give this length to the downsweep (on ground of fairly high impedance). The power of the motor should be sufficient to accelerate the vibrator from point 43 to point 44 in about the same time. Since the motor runs for only about half of the total time, this means that the peak power required of the motor and of the prime generator is about double the minimum conceivable requirement.

A desirable modification to this basic system is given by increasing the eccentricity, at low and possibly very high frequencies, using the devices of FIG. 5. This, of course, accelerates the run-down, allows an increase in the size of the flywheels, and correspondingly demands a higher peak power from the motor. After these adjustments, the cycle may take the same time as before, as suggested in FIG. 8. Curve 48 now shows a faster sweep rate in mid-band (and slower at low and very high frequencies). Curve 49 shows the opposite. The eccentricity employed is suggested in curve 50 (as a function of time, though of course the independent variable is frequency).

Figure 9:
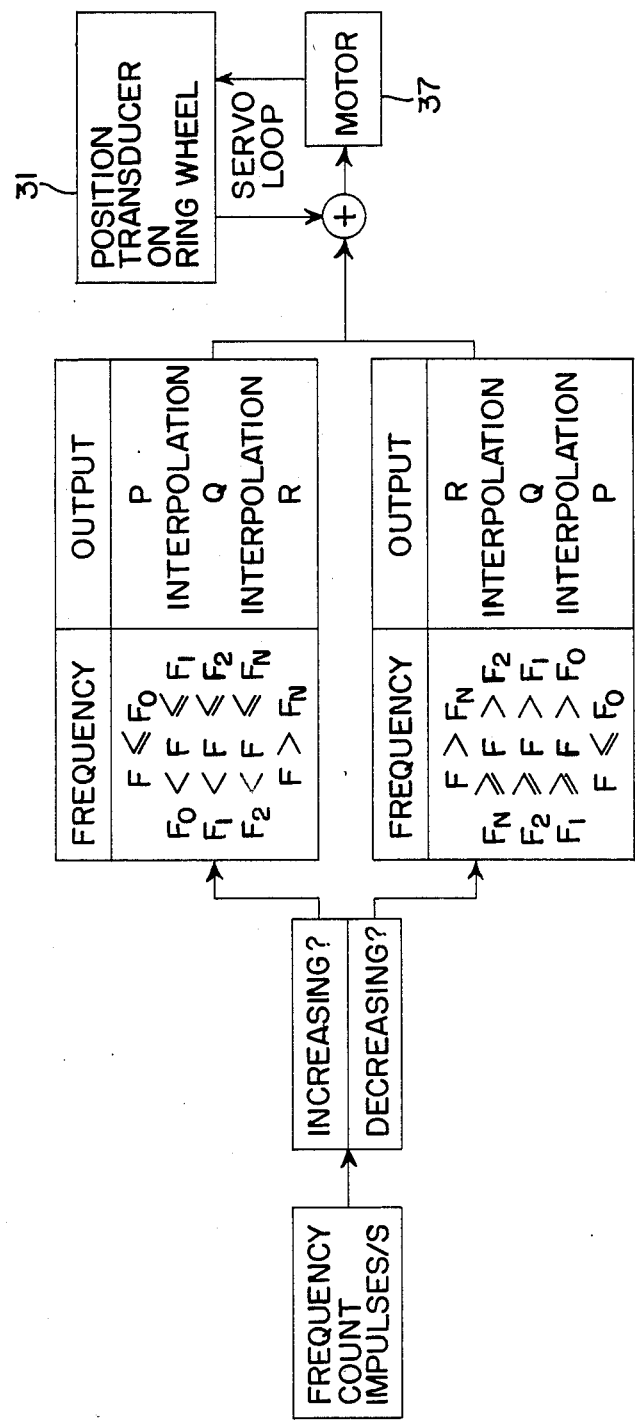
FIG. 9 is a flow chart depicting a method of controlling the eccentricity as a function of frequency.

The manner of controlling the eccentricity is shown in diagrammatic form in FIG. 9. A frequency measurement is made (by counting the impulses obtained from the pick-up 40 in unit 42, or otherwise), and a comparison is made between successive values to determine whether the frequency is increasing or decreasing. A micro-processor of standard configuration can perform this function and the next, which is to generate an output value dependent on frequency in accordance with the tables of FIG. 9. The interpolations can be of any suitable type. A linear interpolation between P and Q, for example, would involve the computation of $P - (P-Q)(f-f_o)/(f_1-f_o)$. The values of $f_o$, $f_1$, $f_2$, $f_N$, P, Q and R can be inserted manually at the vibrator location (for example, by thumbwheel switches), or may be under remote radio control from the recording truck. In the latter case the observer (or an automatic substitute) can increase the value of Q (the "normal" eccentricity) or adjust the other variables if he finds that the sweep is not reaching its lowest planned frequency safely within the time allowed by the correlator.

Figure 10:
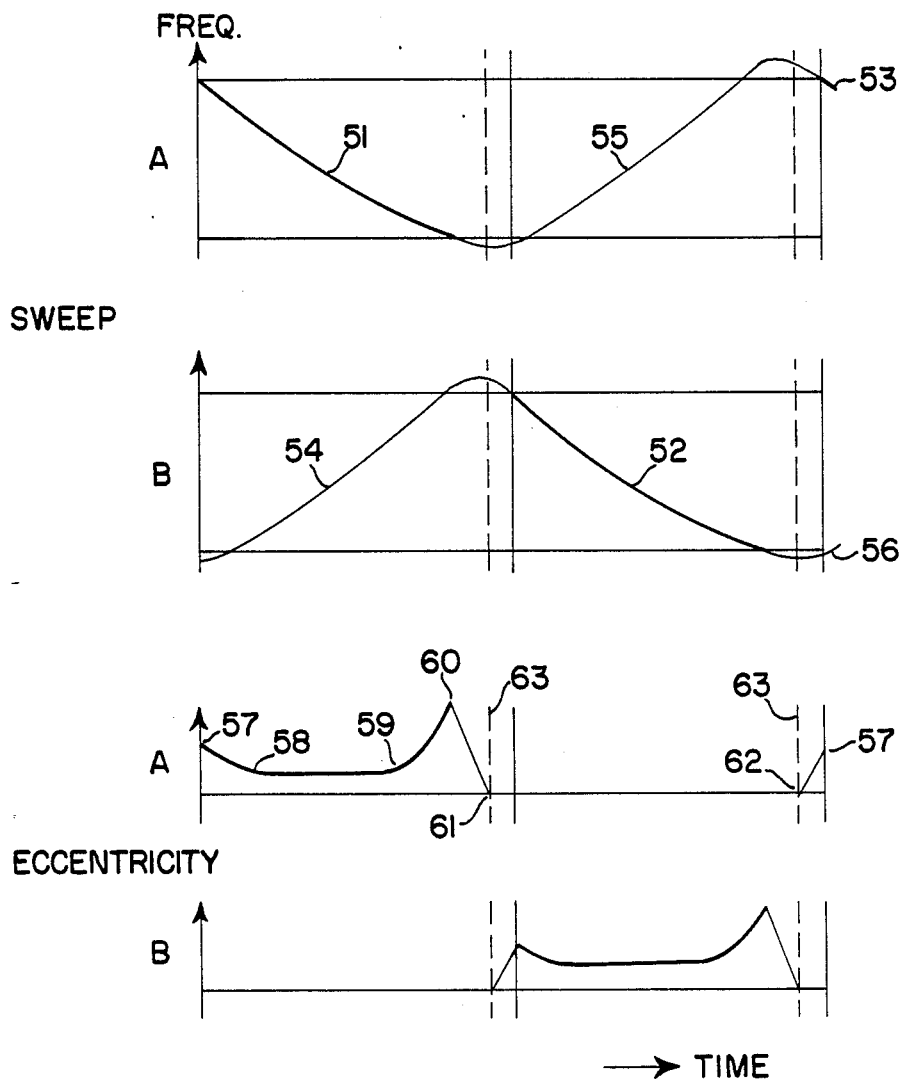
FIG. 10 is a graph of a method using only downsweeps, achieved by the alternation of two vibrators.

A second manner of use of the vibrator is shown in FIG. 10. In this scheme two vibrators are mounted on one truck (possibly on one baseplate, if the baseplate mass is not thereby increased too much). The vibrator is used only on the downsweep, so that the advantage of automatic compensation of the vibrator-ground coupling is always obtained. While the vibrator is being accelerated, between downsweeps, the eccentricity is reduced to zero. One vibrator is thus being accelerated while the other is delivering its downsweep. The motor is running all the time, and the acceleration requires no radiated power. This improves the ratio of average power radiated to peak power consumed.

The upper part of FIG. 10 shows the sweep cycles of the two vibrators A and B; the lower part shows the corresponding eccentricity programs which might be used. The sweeps utilized are designated by 51, 52 and 53. The run-up periods are 54, 55 and 56. The eccentricity decreases slightly over the period 57 to 58, increases considerably over the low-frequency period 59 to 60, and collapses to zero at 61. It stays at zero during the run-up, and then rapidly increases between 62 and the repeat point 57.

Increases of eccentricity are easy, of course. The decrease from 60 to 61 is a large one, but it occurs at low frequency, where the centrifugal force is small. The decrease from 57 to 58 occurs at very high frequency. Therefore it must be either small or slow if the stresses on the gears, and the power of the servomotor, are to be reasonable.

At the time 61 (and its counterparts represented by dashed lines 63), neither vibrator is eccentric. The cycle may be interrupted, the vibrator moved, and the cycle resumed. The ability to move the vibrator is important, of course, for those applications requiring a source array.

Figure 11:
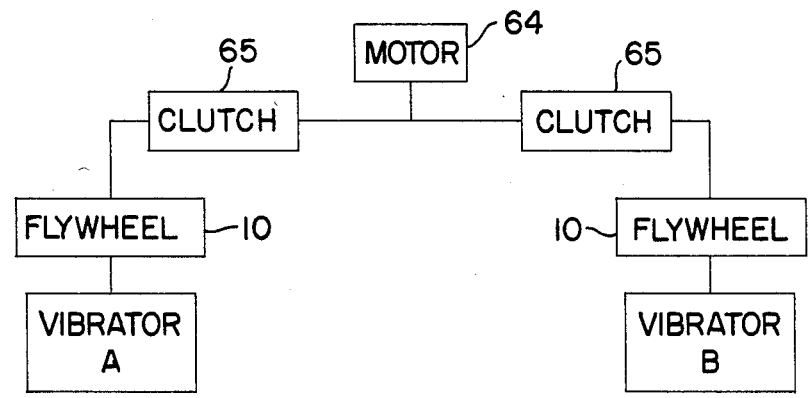
FIG. 11 is a block diagram of a two-vibrator system in which the two vibrators are alternately accelerated by a single motor.

FIG. 11 shows the two vibrators A and B, each with its major flywheel 10, driven from a single motor 64 by means of clutches 65. Alternatively, separate motors may be driven from a single prime generator, and the motors separately excited through switches. In either of these cases, one flywheel 10 is engaged, and the other, released, at the start of each new cycle, such times corresponding to dashed lines 63.

Figure 12:
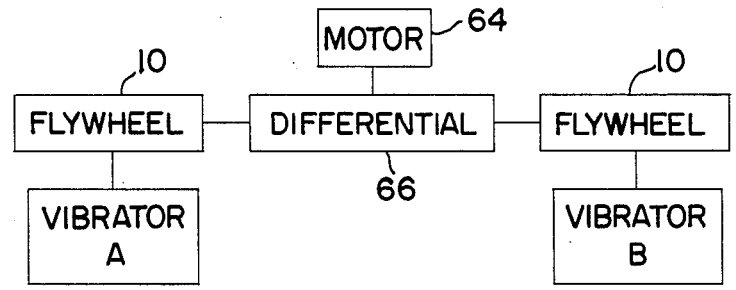
FIG. 12 is a block diagram of a variation of FIG. 11, using a differential instead of two clutches or separate drives.

An alternative is shown in FIG. 12, in which both flywheels are engaged continuously, but through a differential 66. When the weights are eccentric in one vibrator, most of the motor power is directed to accelerating the other. In this way no control is needed, except for the eccentricities of the two vibrators.

For the range of frequencies presently usual in Vibroseis, the motor 64 can drive the system directly. 60 Hz is equivalent to 3600 revolutions/minute. For frequencies of the order of 100 Hz (which become attainable with the enhanced high-frequency output of this vibrator) the motor may be geared.

Hydraulic vibrators currently used in the Vibroseis system have a nominal peak force of 135 kN. However, they apply this full force only at frequencies between 40 and 80 Hz. A swinging-weight vibrator having an eccentric mass of 10 kg and an eccentric radius of 68 mm generates this same force at 50 Hz (with less below, and more above).

Figure 13:
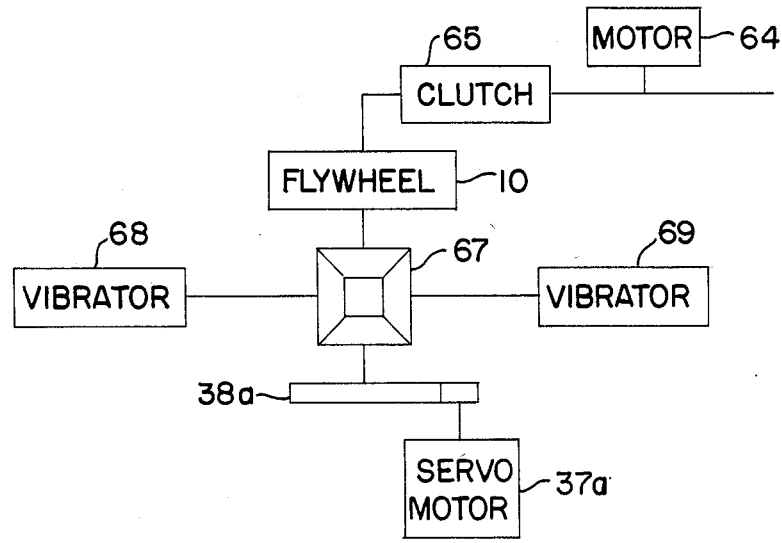
FIG. 13 is a block diagram corresponding to the left half of FIG. 11 and in which the phase between two vibrating units energized by a single flywheel can be varied to maximize or annul their combined output.

An alternative arrangement which effectively allows the equivalent of the eccentricity control described above is disclosed in U.S. Pat. No. 4,234,053 to Erich. In this system two vibrators are used in place of each one described above, and a differential and a servo-motor allow the phase between the two vibrators to be varied. Thus when the phase angle is 0° the output of the compound vibrator is doubled, when it is 90° the output is reduced to $\sqrt{2}$, and when it is 180° the output is zero. FIG. 13, following the left half of FIG. 11, shows in diagrammatic form how this concept may be applied to the present invention. The energy of the flywheel 10 is applied to a differential 67, and thence to the two vibrators 68 and 69. The phase between the two vibrators is changed by energizing the servo-motor 37a through the gear 38a. The servo-motor is driven, in a manner analogous to that described hereinbefore, to provide zero output during acceleration and during movement of the compound vibrator, and to provide increased output at those frequencies requiring additional radiated power.

Usual Vibroseis practice involves 2-4 hydraulic vibrators. With swinging-weight vibrators using the quoted values of mass and radius, it would again be desirable to have a plurality of units. We come, therefore, to what has always been regarded as a compelling advantage of the hydraulic vibrator, and a condemnation of the swinging-weight vibrator—that hydraulic units can be synchronized, while swinging-weight units cannot.

Figure 14:
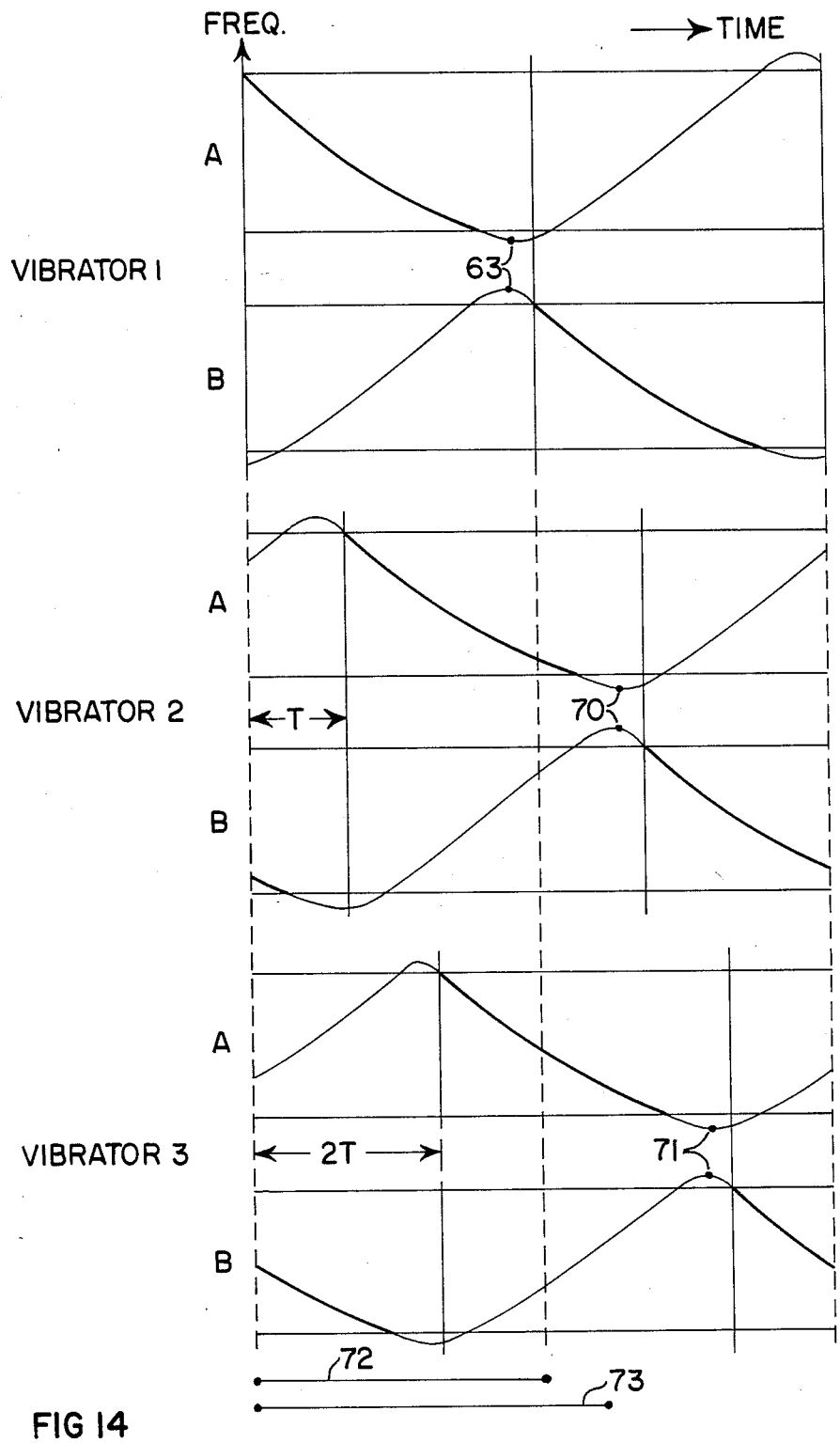
FIG. 14 is a graph illustrating how six vibrators on three trucks can be used simultaneously without requiring synchronization.

FIG. 14 shows a technique by which this objection can be overcome. The first two levels of the diagram repeat the scheme of FIG. 10, for a pair of vibrators mounted on a single truck. The next two levels repeat the same scheme delayed by a time T, radiated by a second pair of vibrators which may be on a second truck. Similarly the final two levels repeat the same scheme delayed by a time of approximately 2T, radiated by a third pair of vibrators which may be on a third truck. As an illustration, the complete cycle time in FIG. 14 might be 1 minute, so that the time between the vertical lines is 30 seconds. Then T might be about 10 s, so that the three trucks emit their signals at approximately 10 s intervals. In this way, even in the presence of differences between vibrators and between vibrator-ground couplings, there is virtually no risk of generating undesirable interference effects between the vibrators (either in the downgoing waves or in the surface waves).

According to the discussion of FIG. 10, a source array can be built up by moving one pair of vibrators at the time of zero eccentricity, denoted 63. In FIG. 14 the first vibrator truck may be moved at this time. Correspondingly, the second vibrator truck is moved at time 70, and the third at time 71. (It is actually an operational advantage to have the lead vibrator move first, followed by the others in turn.)

With the scheme of FIG. 14, the emission and reception of signals is continuous. For correlation purposes it is desirable to cut the signals into segments, typically 30 s in length. In the above example this represents the time between vertical lines in the Figure. Then the correlation operation is done by correlating the transmitted signal of length indicated at 72 against the received signal of length indicated at 73, where the difference between these two is the maximum reflection time of interest. Typically this requires accumulation of the received signal in two stores. The first stores 36 s of signal, and the second receives (and continues to receive for 36 s) the signal 30 s after the first. As before, the signal against which the correlation is made may be truncated at the desired limit frequencies.

With this system, it is desirable to correlate first, and to stack the correlated results over the desired number of emissions. This is in contradistinction to the usual practice with controllable hydraulic vibrators, where it is usual to stack first and correlate after. In this respect it may be advantageous to use a sign-bit system (particularly when many channels are desired).

Since the power output of a swinging-weight vibrator rises at high frequencies, these vibrators are excellent for modern high-resolution studies. However, the full requirement for good resolution includes a balanced need for the low frequencies also. We consider next how this may be achieved.

First, the uncontrolled downsweep from a swinging-weight vibrator is inherently non-linear. Thus, although the force developed is very large at high frequencies, the sweep dwells in the high frequencies for only a short time. Conversely, the force developed is small at low frequencies, but the sweep rate is also small.

Second, as explained hereinbefore, the arrangement of FIG. 6 provides the ability to increase both the eccentric mass and the radius of eccentricity, under frequency-dependent control.

Figure 15:
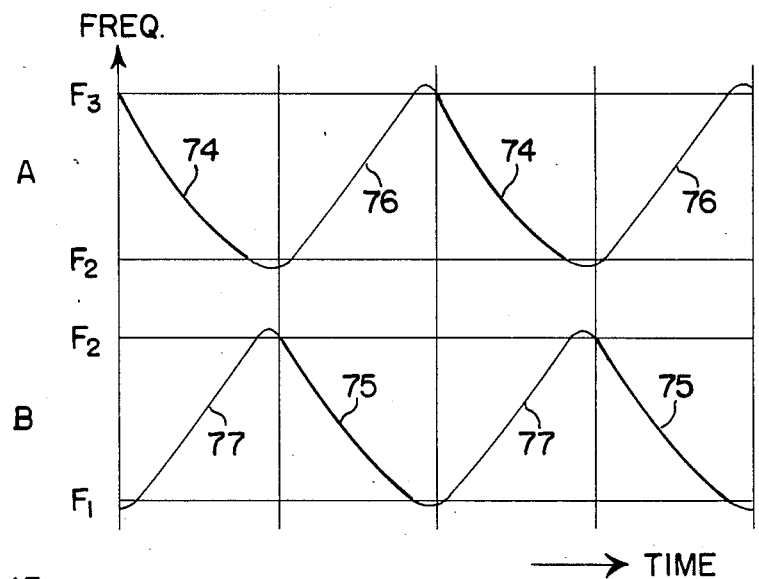
FIG. 15 is a graph showing how two vibrators may cooperate to furnish different parts of the frequency range.

Third, FIG. 15 shows how two vibrators having un-equal weights can cooperate to form a substantially continuous sweep in which the vibrator with the smaller weight contributes the high-frequency part 74 of the sweep and that with the larger weight the low-frequency part 75. To maintain the approximate 30-second cycle of the previous illustrations, the two parts of the sweep may each be something less than 15 seconds. Each vibrator has its own run-up time 76-77. The master sweeps used in correlation may be truncated exactly at the cross-over frequency $f_2$.

Figure 16:
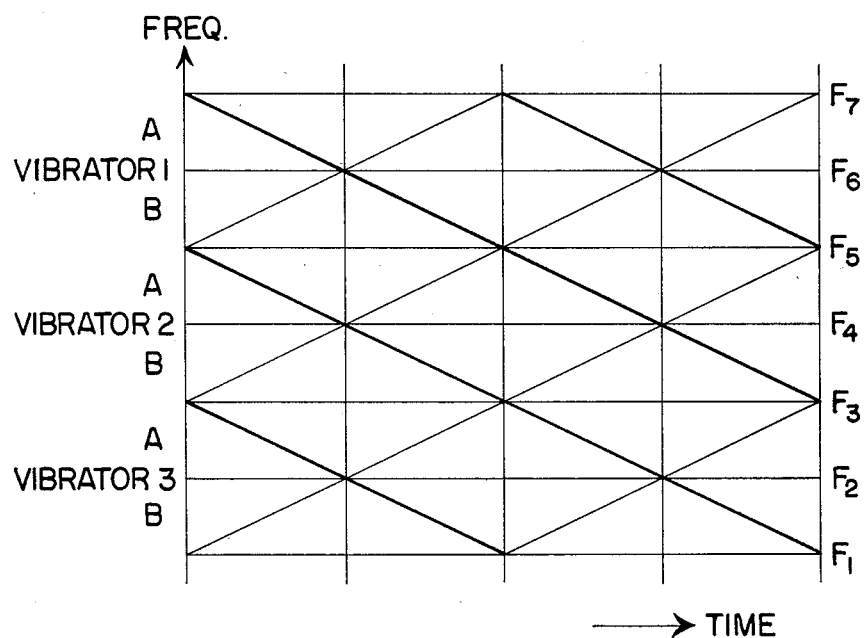
FIG. 16 is a graph of the method using six vibrators.

The principle of FIG. 15 can be extended directly to that of FIG. 16, in which (now in simplified diagrammatic form) there is shown a scheme by which three pairs of vibrators, on different trucks, can cooperate to generate very long overlapping sweeps. Now each vibrator operates in only one-sixth of the desired frequency range, and is configured with a weight and an eccentricity appropriate to that narrow range. At any one time, three signals of different frequency are being emitted, but the separation between them is sufficient to protect against mis-correlations. The disadvantage with this system, of course, is that any vibrator which fails must be repaired or replaced before work can be resumed. The systems of the earlier figures do not have this disadvantage.

Fourth, it remains possible to radiate the lowest frequencies from a separate "woofer" vibrator of different type. This might even be a single hydraulic vibrator, specially configured for the low frequencies, operating simultaneously with the "tweeter" swinging-weight vibrators.

Clearly, many variations of detail (both in mechanical implementation and in manner of use) can be made without departing from the scope of the invention. All such variations, modifications and equivalents within the scope of the following claims are encompassed by the invention.

It is a particular feature of the invention that its spectrum-shaping facility remains fully effective when multiple vibrators are used. The considerations are as follows.

(a) We can visualize (or actually provide, by a framework carrying springs and dashpots) a "reference surface" on which a vibrator can operate. This reference surface provides no resonances of vibrator-ground coupling within the desired frequency range. On this surface the vibrator yields the frequency-time curve 7 of FIG. 2. The sweep rate decreases monotonically with time.

(b) Since the amplitude spectrum of the auto-correlation of the sweep is inversely proportional to the sweep rate, the effect of the changing sweep rate on the reflection pulse can be counteracted, if desired, by correlating against a sweep whose amplitude is directly proportional to sweep rate. The amplitude variations can be inserted at the time the master sweep is fabricated from the phase codes discussed earlier.

(c) In the same way we could, if we chose, remove the spectral consequences of the change of sweep rate introduced by a resonance in the vibrator-ground coupling (curve 8 in FIG. 2).

(d) Again, we could compensate the change of sweep rate introduced by imposed variations in the eccentricity of the vibrator.

(e) We may also choose to modify the spectrum to be that obtained from a constant-force or constant-velocity device. The 6 dB/octave slopes necessary for this can be incorporated into the amplitude of the master sweep as above, or implemented by a separate operator at a later stage of the processing.

(f) If we are using a driven upsweep as well as a free downsweep (FIG. 7), we can use the sweep-rate variations observed on the downsweep to compensate the undesirable effect of the variations on the upsweep.

(g) Whichever compensation (or combination of compensations) we care to make, we can choose to make it on the amplitude of the reconstituted master sweep before correlation. Since each vibrator output is correlated separately, and subsequently stacked, we have total control of the compensation of each vibrator and its coupling with the ground. Thus the common situation where one vibrator is on a road, and another on a grass verge (or one on an outcrop, and another on pasture) can be fully compensated; this is a significant advantage over hydraulic vibrators.

In fact, of course, we may choose to apply only partial compensation for the above effects. Thus the general monotonic decrease of sweep rate increases the useful output at low frequencies (as discussed hereinbefore), and we may elect not to compensate it entirely. The changes of sweep rate introduced by a resonance in the vibrator-ground coupling are beneficial, and in general we would not compensate them. The increase in force output at the high frequencies may be beneficial if our problem is resolution, and we may elect to retain its benefit. The increase in sweep rate when we increase the eccentricity, however, acts to negate the advantage. We would usually choose to compensate this.

There are thus excellent possibilities, with this system, for attaining a desired signal spectrum whether that desired spectrum is flat between wide limits, or whether it incorporates compensation for absorption or other frequency-selective effects along the seismic path. And all this is done by using the measurement of frequency and sweep rate as a function of time to generate amplitude variations of the master sweep as a function of frequency.

Also noteworthy is the possibility that this vibrator could be made portable, and thus bring Vibroseis (for the first time) to areas impenetrable by heavy trucks. For this application the prime mover(s) would run at very high speed, to minimize the need for mass in the flywheel. The vibrators, the prime movers and the flywheels would represent separate packages, each capable of being man-handled. A sprung platform would allow the men who carry the equipment to double as hold-down weight.

The present invention has been described in terms of a vibrator generating compressional waves. A companion application U.S. Ser. No. 337,750 entitled "Seismic Exploration Using Compressional and Shear Waves Simultaneously" describes a development of this invention for generating compressional and shear waves simultaneously, and a method of seismic exploration based thereon.

I claim:

1. A swinging-weight vibrator for the generation of swept-frequency waves in seismic exploration, and which automatically provides a measure of compensation for the frequency dependence of the vibrator-ground coupling, comprising:

drive means to provide rotational energy;

flywheel means by which said rotational energy may be stored;

first coupling means between said drive means and said flywheel means, by which the flywheel means can be accelerated to a desired first frequency;

a rotatably swinging weight constituting the vibrating element;

second coupling means between said flywheel means and the vibrating element;

baseplate means by which the forces generated by the vibrating element may be coupled to the earth;

disabling means by which the forces generated by the vibrating element may be effectively annulled during acceleration and spatial movement of the vibrator;

means to cause effective release of said first coupling, so that said flywheel and said vibrating element decelerate freely to a desired lower second frequency while radiating seismic waves into the ground; and monitoring means by which a signal can be derived representative of the rotation of the vibrating element.

2. A vibrator according to claim 1, in which said disabling means includes means for controllably varying the eccentric mass and the eccentric radius of the swinging weight.

3. A vibrator according to claim 1 comprising two like vibrating elements and in which said disabling means includes a phasing control between the two like vibrating elements, so that by variation of the phase the individual outputs of the two vibrating elements can supplement each other or cancel each other.

4. A compound vibrator formed of two vibrators each according to claim 1 in which said drive means is common to the two vibrators and in which said first coupling means in each vibrator is a clutch engaged in one vibrator and disengaged in the other, thereby providing acceleration of one vibrator during deceleration of the other.

5. A compound vibrator formed of two vibrators each according to claim 1 in which said drive means is common to the two vibrators and in which said first coupling means is a differential driving both vibrators and constructed and arranged for providing acceleration of one vibrator during deceleration of the other.

6. A compound vibrator formed of two vibrators each according to claim 3 in which said drive means is common to the two vibrators and in which said first coupling means in each vibrator is a clutch engaged in one vibrator and disengaged in the other, thereby providing acceleration of one vibrator during deceleration of the other.

7. A compound vibrator formed of two vibrators each according to claim 3 in which said drive means is common to the two vibrators and in which said first coupling means is a differential driving both vibrators and constructed and arranged for providing acceleration of one vibrator during deceleration of the other.

8. A vibrator according to claim 1 and providing a very light baseplate, in which only said rotatable swinging weight is mounted on said baseplate and in which said second coupling means includes a flexible member.

* * * * *